(12) United States Patent
Haselsteiner

(10) Patent No.: US 11,498,423 B2
(45) Date of Patent: Nov. 15, 2022

(54) RAIL TREATMENT MACHINE ABLE TO BE MOVED ON RAILS

(71) Applicant: MATE GmbH, Kirccham bei Vorchdorf (AT)

(72) Inventor: Philipp Haselsteiner, Hausmening (AT)

(73) Assignee: Mate GmbH, Kirccham bei Vorchdorf (AT)

( * ) Notice: Subject to any disclaimer, the term of this patent is extended or adjusted under 35 U.S.C. 154(b) by 46 days.

(21) Appl. No.: 17/251,931

(22) PCT Filed: Apr. 2, 2020

(86) PCT No.: PCT/AT2020/060135
§ 371 (c)(1),
(2) Date: Dec. 14, 2020

(87) PCT Pub. No.: WO2020/198774
PCT Pub. Date: Oct. 8, 2020

(65) Prior Publication Data
US 2021/0261002 A1    Aug. 26, 2021

(30) Foreign Application Priority Data

Apr. 2, 2019 (AT) ................................ A50284/2019

(51) Int. Cl.
*B60L 1/00* (2006.01)
*B60L 58/40* (2019.01)
(Continued)

(52) U.S. Cl.
CPC ............... *B60L 1/003* (2013.01); *B60L 50/75* (2019.02); *B60L 58/40* (2019.02); *B61C 3/02* (2013.01);
(Continued)

(58) Field of Classification Search
None
See application file for complete search history.

(56) References Cited

U.S. PATENT DOCUMENTS

| 6,308,639 B1 | 10/2001 | Donnelly et al. |
| 2006/0061307 A1 | 3/2006 | Donnelly |

(Continued)

FOREIGN PATENT DOCUMENTS

| CN | 107 244 326 A | 10/2017 |
| CN | 108 016 457 A | 5/2018 |

(Continued)

*Primary Examiner* — Jared Fureman
*Assistant Examiner* — Joel Barnett
(74) *Attorney, Agent, or Firm* — Muirhead and Saturnelli, LLC

(57) ABSTRACT

A rail-mounted rail processing machine has at least one traction motor and with at least one working unit for processing tracks, a permanent energy source, an electrical energy storage and a current collector. The components are connected to a common direct current network via power converters. In order to create a rail-mounted rail processing machine that allows low-maintenance and environmentally friendly operation of working aggregates with strongly varying peak loads without having to accept losses in the processing quality, the permanent energy source is a fuel cell which feeds at least one base load of the working unit into the direct current network via one of the power converters. To cover peak loads of at least the working unit, buffer energy of the electrical energy storage acting as a buffer store is feedable into the direct current network via an associated one of the power converters.

19 Claims, 2 Drawing Sheets

(51) Int. Cl.
  *B60L 50/75*  (2019.01)
  *B61C 3/02*  (2006.01)
  *B61C 17/06*  (2006.01)
  *E01B 31/08*  (2006.01)
  *E01B 31/13*  (2006.01)
  *E01B 31/17*  (2006.01)

(52) U.S. Cl.
  CPC .............. *B61C 17/06* (2013.01); *E01B 31/08* (2013.01); *E01B 31/13* (2013.01); *E01B 31/17* (2013.01)

(56) References Cited

U.S. PATENT DOCUMENTS

| | | | | |
|---|---|---|---|---|
| 2007/0002995 | A1* | 1/2007 | Hemmi | B60L 9/22 375/377 |
| 2011/0316333 | A1* | 12/2011 | Still | B60L 1/003 307/9.1 |
| 2012/0288342 | A1* | 11/2012 | Rungger | E01B 31/13 409/231 |
| 2015/0246717 | A1* | 9/2015 | Fournier | C25B 1/04 244/30 |
| 2015/0367736 | A1 | 12/2015 | Salomonsen | |
| 2016/0152129 | A1* | 6/2016 | West | B60K 6/22 180/65.21 |
| 2019/0016348 | A1* | 1/2019 | Greindl | B61C 7/04 |

FOREIGN PATENT DOCUMENTS

| | | |
|---|---|---|
| DE | 601 25 746 T2 | 11/2007 |
| EP | 1 724 147 A2 | 11/2006 |
| EP | 2 599 656 A1 | 6/2013 |
| EP | 3 118 080 A1 | 1/2017 |
| WO | WO 2006/020667 A2 | 2/2006 |
| WO | WO 2006/116479 A1 | 11/2006 |
| WO | WO 2017/050414 A1 | 3/2017 |
| WO | WO 2018/210533 A1 | 11/2018 |

* cited by examiner

RAIL TREATMENT MACHINE ABLE TO BE MOVED ON RAILS

TECHNICAL FIELD

The system described herein relates to a rail-mounted rail processing machine with at least one traction motor and with at least one working unit for processing tracks.

BACKGROUND OF THE INVENTION

From the state of the art, electrically operated rail vehicles are known to perform various maintenance work on a track system. The rail vehicle revealed in WO2018210533A1 has an energy storage system designed as an accumulator, which electrically supplies several working drives for carrying out maintenance work. The energy accumulator can be charged, for example, via a charging device, an overhead line, or a generator coupled to a combustion engine. The disadvantage of this, however, is that the capacity of the energy accumulators is limited, so that especially during maintenance work on track systems without overhead contact lines, such as overhead lines, or during work on underground track systems, where combustion engines are completely unsuitable due to their toxic emissions, only working units with low energy consumption and foreseeable peak loads can be supplied. Another disadvantage is that the frequent charging and discharging cycles of the energy storage unit, which is designed as an accumulator, considerably reduce its service life.

SUMMARY OF THE INVENTION

The system described herein is thus based on the task of proposing a rail-mounted rail processing machine which allows low-maintenance and environmentally friendly operation of working units with widely varying peak loads without having to accept any loss of processing quality.

The system described herein solves the set task by the fact that the permanent energy source is a fuel cell which feeds at least a base load of the working unit into the direct current network via the power converter, and in that, to cover peak loads of at least the working unit, buffer energy of the energy store acting as a buffer store is feedable into the direct current network via the associated power converter.

The fuel cell, for example of the Proton—Exchange—Membrane type, acts as a permanent energy source and is therefore designed to cover at least one base load of one or more working units. The expected average performance of the working units can be regarded as the base load. Since the fuel cell is used directly to drive the working unit and/or the traction motors without the interposition of any other energy storages, losses in efficiency caused by storage or conversion can be minimized. Particularly in rail machining processes, the power requirements vary greatly, which is why additional energy sources are used to cover power peaks in order to maintain the required machining quality. According to the system described herein, this is done by means of an energy storage, for example a battery module or capacitor, which acts as a buffer storage and only supplies the working unit with energy when performance requirements exceed the base load, or for example during the start-up process of the fuel cell. Due to the fact that these power peaks only occur temporarily, only part of the energy store is discharged, which leads to a considerable reduction in the number of charging cycles and thus increases the service life of the energy storage unit. If the fuel cell is designed accordingly, it is also possible to supply the traction motors with electricity, which means that the rail-mounted rail processing machine may be operated completely independently of any other energy source, such as traction current or an electric generator. Thus, the rail processing machine may also be designed as a two-way vehicle, which allows for locomotion on tracks as well as independent of traction current on the road. If traction current is nevertheless available, the current may be obtained via a current collector of the device according to the system described herein. Since the various energy sources and consumers interact at different voltage levels, the sources and consumers are connected to a direct current network connecting the energy sources and consumers via various power converters.

Especially when operating the working unit, unpredictable temperature fluctuations may occur in the fuel cell, which may also cause the fuel cell to overheat without exceeding its rated output. In order to be able to operate the fuel cell at its optimum operating conditions and to prevent the fuel cell from being switched off due to overheating, it is suggested that the base load is a value stored on a memory, which may be adapted via a control unit as a function of the travelling speed of the rail processing machine, the process temperature and the required aggregate power. Accordingly, the base load does not have to be a fixed value, for example a design power of the fuel cell, but is continuously calculated on the basis of a mathematical model, depending on the travel speed of the rail processing machine, the process temperature, for example the ambient temperature and/or the temperature of the fuel cell, and the required aggregate power.

The energy supply system according to the system described herein, which comprises the fuel cell and the buffer storage for covering peak loads, may be used particularly effectively if the working unit comprises at least one tool, in particular a milling and/or grinding tool, for machining or a tool for forming, in particular a rolling, beating or laser tool, of a rail head of a rail. Machining processes, in particular machining and forming processes, cause different loads depending on the thickness, hardness or surface condition of a rail layer to be machined or to be processed. By switching on the buffer energy of the buffer storage, the required machining quality may be maintained even with particularly stubborn materials.

In order to enable a continuous use of the rail processing machine independent of previous work steps, it is proposed that the traction current provided by the current collector from an overhead line and/or conductor rail is provided for charging the energy storage and/or for the electrical supply of the at least one traction motor. In this way, the energy storage may be charged permanently or temporarily if the corresponding infrastructure is available. By different combinations of the available energy sources, namely buffer energy and traction current, there are various possibilities to operate the rail processing machine. For example, during transfer or working runs, the traction current may be used to drive the traction motor, while the fuel cell and the buffer storage are used to cover the base and peak load of the working unit. In an alternative drive concept, for example, the base and peak loads of the working unit may also be covered by the traction current. For rail machining processes in tunnels, for example, it is advisable if all the base load, i.e. both the base load of the working unit and that of the traction motors, is covered by the fuel cell and the energy storage supplies the respective consumers with electricity during peak loads.

In order that the different energy sources may be used in a coordinated manner according to their optimal working range depending on the power requirement, it is recommended in a particularly practical version of the device according to the system described herein that the connection of the buffer energy or the traction current provided via the current collector may be carried out, in particular controlled, by means of a battery management system as a function of the required power of at least the working unit. For this purpose, the battery management system may be connected to various energy sources and consumers via a bus system, for example, and monitors the prevailing voltage of the overhead line and/or conductor rail providing traction current, the required power of the traction motors and the working units and controls the switching between the energy sources depending on the required power. Since the fuel cell cannot provide full nominal power of the fuel cell immediately after activation, the required power of the traction motor and/or the working units may be covered in the meantime by the traction current or the buffer storage. As a matter of principle, the fuel cell may always be operated at nominal power, except when starting up, which is sufficient to cover the base load of at least the working units. However, if the nominal power is exceeded due to peak loads caused by the consumers, the battery management system switches on the buffer storage or, if available, the traction current. Switching on and off is done under constant current measurement of the fuel cell. If the current of the fuel cell increases, the battery management system throttles the current supply of the buffer storage or the traction current depending on the current flow of the fuel cell. In order to achieve an uninterrupted switchover induced by the battery management system, which activates the other, still functioning energy source in case of failure of the fuel cell or the traction current, between the energy sources, contactors with normally closed and normally open contacts may be provided for the respective energy sources. As a result of these measures, a constant machining quality, which is particularly required for continuously operating working units with milling and/or grinding tools, may be guaranteed.

In order to be able to operate the rail processing machine on a permanent basis largely independent of external energy sources for the fuel cell, the rail processing machine may be assigned an electrolyser, which may be supplied by the traction current provided by the current collector and/or by buffer energy. In this way, water produced during operation of the fuel cell may be converted by means of traction current into the electrolysis products hydrogen and oxygen, which in turn may be used as educts for the fuel cell or stored in gas storage tanks.

A further advantage with regard to an energy-autonomous further development of the rail processing machine according to the system described herein is that the electrical energy storage may be charged via an electromotive brake of the traction motor. In this way, the kinetic energy may be easily stored in the energy storage and reused for the production of hydrogen, for example. Alternatively, a heating resistor may be assigned to the electromotive brake, the waste heat of which heating resistor may be supplied to the rail to be processed for pre-tempering the rail. In addition, the waste heat from the fuel cell may also be supplied to the rail to be processed for pre-tempering the rail. The resulting waste heat may be used to dry or de-ice the rails or to remove snow, for example. By eliminating these weather-related disturbance factors, an exact application of various measuring systems required for the rail machining processes may be achieved, thus ensuring perfect machining quality even in winter or rain.

The device may be controlled by a method for regulating the energy supply of a rail-mounted rail processing machine, wherein a base load of a working unit is covered by a permanent energy source. In order to be able to operate the device in an environmentally friendly and resource-saving manner even with strongly varying peak loads without having to accept the risk of overheating the fuel cell, it is proposed that an energy storage is connected to cover a peak load exceeding the base load of the permanent energy source designed as a fuel cell and in that a threshold value representing the limit between base load and peak load is determined for a time n predictively as a function of process variables and the required aggregate power of a preceding time n−1. Accordingly, the threshold value may not be a fixed value, but may continuously be redefined with the help of a predictive model calculation. Thus the base load may also be a continuously changing value. If the rail processing machine is subsequently required to provide a certain actual power which is below the threshold value, this actual power may be completely covered by the fuel cell. If various process variables change, the newly calculated threshold value may fall below the required actual power, so that the energy storage is switched on in favour of an optimum overall efficiency. By changing the threshold value, the ratio between the energy provided by the fuel cell, which covers the base load, and the energy storage unit, which covers the peak load, may be adjusted for the required actual power. To calculate the threshold value for a certain point in time n, the predictive model calculation may use the required aggregate power measured at a point in time n−1, i.e. a point in time preceding the point in time n, and measured process variables, such as the travel speed of the rail processing machine, the ambient temperature, and the temperature of the fuel cell. In addition, any disturbance variables may also be included in the model calculation. In a particularly practical version, the model calculation may be optimized using common machine learning algorithms. This predictive control with the help of the model calculation allows the fuel cell to be operated at its operating optimum due to the continuous adjustment of the threshold value in favour of maximising the overall efficiency.

BRIEF DESCRIPTION OF THE DRAWINGS

The drawing shows a block diagram of the system described herein.

DESCRIPTION OF VARIOUS EMBODIMENTS

Figure 1:
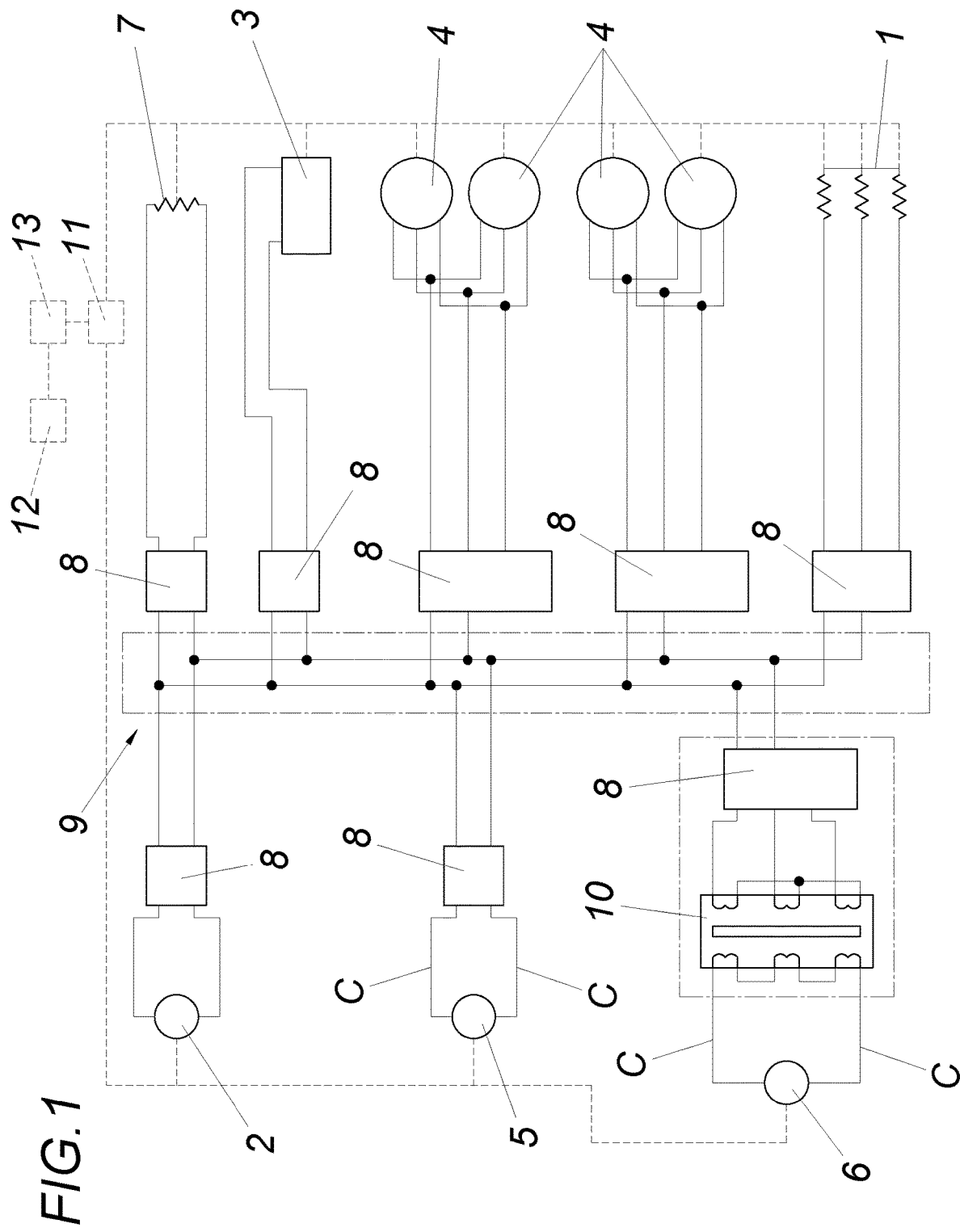
FIG. 1 is a block diagram of a rail-mounted rail processing machine according to the system described herein.

A rail processing machine that is movable on rails according to the system described herein has a working unit 1 for the processing of rails. A basic load of the working unit 1 is covered by a fuel cell 2. Since mainly machining and forming working units 1, such as milling or grinding tools and rolling, impact or laser tools have strongly varying peak loads, an energy storage 3 acting as a buffer storage is provided for covering peak loads. Although the nominal output of the fuel cell 2 is designed in such a way that the fuel cell 2 may supply both the working unit 1 and traction motors 4 with electricity, additional traction current may be obtained from a conductor rail 5 or an overhead line 6 if the infrastructure is available. The various energy sources (the fuel cell 2, the energy storage 3, the conductor rail 5, the overhead line 6) and consumers (the working unit 1, the traction motors 4, a heating resistor 7) may be connected to a direct current network 9 via power converters 8. Depending on the energy source 2, 3, 5, 6 or consumers 1, 4, 7, different power converters 8 may be used, so that a desired voltage of the direct current network 9 may be achieved. For example, if the overhead line 6 has an AC voltage of 25 kV/50 Hz, for example, the voltage must first be transformed by a transformer 10 to an AC voltage of 400 V/50 Hz, for example, before the voltage is brought to a desired DC voltage, for example 750 V, of the direct current network 9 by the power converter 8. It is advantageous that the fuel cell 2 supplies the working unit 1 without intermediate storage or actuators, which minimizes efficiency losses caused by storage or conversion.

In order to be able to charge the energy storage 3 during a transfer or working trip, traction current of the conductor rail 5 and/or the overhead line 6 may be provided by a current collector C.

Since the fuel cell 2 may not immediately provide rated power of the fuel cell 2 when starting up, any base or peak loads may be covered by the energy storage 3 used as a buffer storage unit, by the conductor rail 5, or by the overhead line 6 until the rated power is reached. In order to achieve a continuous and coordinated transition of these energy sources 2, 3, 5, 6, a battery management system 11 may be used, which is connected, for example via a bus system, to the energy sources 2, 3, 5, 6 and to the consumers 1, 4, 7 under constant power measurement. The battery management system 11 may switch various connected components on or off without interruption. This automatic switchover is provided for, for example, in the event of failure of the fuel cell 2, the conductor rail 5, or the overhead line 6 if one of the energy sources 2, 3, 5, 6 fails.

The base load may be a variable value stored in a memory 12, which may be adapted via a control unit 13 depending on the travel speed of the rail processing machine, the process temperature and the required aggregate power. The control unit 13 may be actively connected to the battery management system 11 or may be the battery management system 11 itself.

Advantageously, the traction motors 4 may act as an electromotive brake and thus charge the energy storage 3. If the energy storage 3 is already fully charged, the excess energy may be diverted to the heating resistor 7 and the waste heat may be used to temper the rail.

Figure 2:
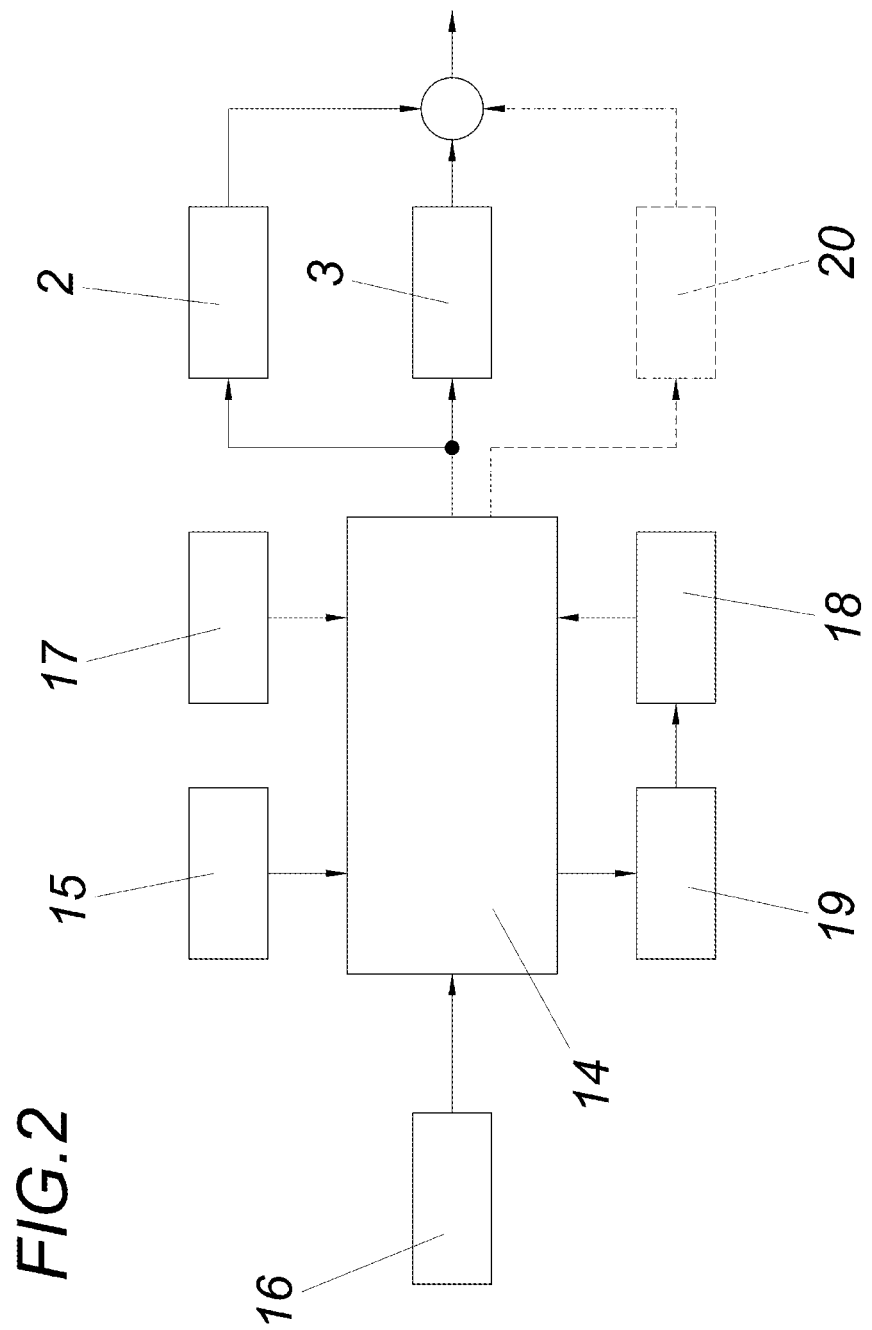
FIG. 2 a block diagram of a method for controlling an energy supply of a rail-mounted rail processing machine according to the system described herein.

FIG. 2 shows a block diagram of a method for controlling the energy supply of the rail-mounted rail processing machine. In order to be able to calculate an optimum ratio between the energy provided by the fuel cell 2 and the energy provided by the energy storage 3 with regard to a maximum overall efficiency, a predictive model calculation 14 may be carried out on the control unit 13. The predictive model calculation 14 calculates a threshold value, which represents the limit between base load and peak load, for a time n. This means that at a certain required actual load, by changing the threshold value, the ratio between the proportion of energy provided by the fuel cell 2 and that provided by the energy storage 3 may be adjusted. The threshold value at time n may be calculated depending on process variables 15 and an aggregate power 16 at time n−1. Disturbance variables 17 may also be included in the model calculation 14, which is continuously optimized using a machine learning algorithm 18. The machine learning algorithm 18 compares measured data 19 with the data calculated by the model calculation 14. In a particularly preferred design, a traction current 20 provided by the overhead line 6 or the conductor rail 5 may also be added to the electrical supply.

The system described herein is not restricted to the described embodiments. It may be varied within the scope of the claims, taking into account the knowledge of the relevant person skilled in the art. Other embodiments of the system described herein will be apparent to those skilled in the art from a consideration of the specification and/or an attempt to put into practice the system described herein. It is intended that the specification and examples be considered as illustrative only, with the true scope and spirit of the invention being indicated by the following claims.

The invention claimed is:

1. A rail-mounted rail processing machine, comprising:
at least one traction motor;
at least one working unit for processing tracks;
a permanent energy source;
an electrical energy storage; and
a current collector that provides traction current to the traction motor, and the working unit, the permanent energy source, the electrical energy storage, the current collector, the traction motor and the working unit being connected to a common direct current network via power converters, wherein the permanent energy source is a fuel cell which feeds at least a base load of the working unit into the direct current network via one of the power converters, and wherein, to cover peak loads of at least the working unit, buffer energy of the electrical energy storage acting as a buffer store is feedable into the direct current network via an associated one of the power converters, wherein the base load is a value stored on a memory, which can be adapted via a control unit as a function of travelling speed of the rail processing machine, a process temperature and required aggregate power.

2. The rail-mounted rail processing machine according to claim 1, wherein the working unit includes at least one tool, the tool being at least one of: a milling and/or grinding tool, a tool for machining, a tool for forming, a rolling, beating or laser tool, or a tool of a rail head of a rail.

3. The rail-mounted rail processing machine according to claim 1, wherein the traction current provided by the current collector from an overhead line and/or a conductor rail is provided for charging the electrical energy storage and/or for electrically supplying the at least one traction motor.

4. The rail-mounted rail processing machine according to claim 3, wherein connection of the buffer energy or the traction current provided via the current collector uses a battery management system as a function of required power of at least the working unit.

5. The rail-mounted rail processing machine according to claim 4, wherein the rail processing machine is assigned an electrolyser which is suppliable by the traction current provided by the current collector and/or by the buffer energy.

6. The rail-mounted rail processing machine according to claim 5, wherein the electrical energy storage is chargeable via an electromotive brake of the traction motor.

7. The rail-mounted rail processing machine according to claim 6, wherein a heating resistor is associated with the electromotive brake, and wherein waste heat of the heating resistor is supplied to a rail to be processed for pre-tempering the rail.

8. The rail-mounted rail processing machine according to claim 7, wherein waste heat of the fuel cell is supplied to a rail to be processed for pre-tempering the rail.

9. The rail-mounted rail processing machine according to claim 1, wherein connection of the buffer energy or the traction current provided via the current collector uses a battery management system as a function of required power of at least the working unit.

10. The rail-mounted rail processing machine according to claim 1, wherein the rail processing machine is assigned an electrolyser which is suppliable by the traction current provided by the current collector and/or by the buffer energy.

11. The rail-mounted rail processing machine according to claim 1, wherein the electrical energy storage is chargeable via an electromotive brake of the traction motor.

12. The rail-mounted rail processing machine according to claim 11, wherein a heating resistor is associated with the electromotive brake, and wherein waste heat of the heating resistor is supplied to a rail to be processed for pre-tempering the rail.

13. The rail-mounted rail processing machine according to claim 1, wherein the working unit includes at least one tool, the tool being at least one of: a milling and/or grinding tool, a tool for machining, a tool for forming, a rolling, beating or laser tool, or a tool of a rail head of a rail.

14. A rail-mounted rail processing machine, comprising:
at least one traction motor;
at least one working unit for processing tracks;
a permanent energy source;
an electrical energy storage; and
a current collector that provides traction current to the traction motor, and the working unit, the permanent energy source, the electrical energy storage, the current collector, the traction motor and the working unit being connected to a common direct current network via power converters, wherein the permanent energy source is a fuel cell which feeds at least a base load of the working unit into the direct current network via one of the power converters, and wherein, to cover peak loads of at least the working unit, buffer energy of the electrical energy storage acting as a buffer store is feedable into the direct current network via an associated one of the power converters, wherein waste heat of the fuel cell is supplied to a rail to be processed for pre-tempering the rail.

15. A method for controlling an energy supply of a rail-mounted rail processing machine, having a base load of a working unit covered by a permanent energy source, comprising:
connecting an energy storage in order to cover a peak load exceeding the base load of a permanent energy source designed as a fuel cell; and
determining a threshold value representing a limit between base load and peak load for a time n predictively as a function of process variables and required aggregate power of a preceding time n−1.

16. The method for controlling the energy supply of a rail-mounted rail processing machine, according to claim 15, wherein the working unit includes at least one tool, the tool being at least one of: a milling and/or grinding tool, a tool for machining, a tool for forming, a rolling, beating or laser tool, or a tool of a rail head of a rail.

17. The method for controlling the energy supply of a rail-mounted rail processing machine, according to claim 15, wherein the energy storage is chargeable via an electromotive brake of the traction motor.

18. The method for controlling the energy supply of a rail-mounted rail processing machine, according to claim 17, wherein a heating resistor is associated with the electromotive brake, and wherein waste heat of the heating resistor is supplied to a rail to be processed for pre-tempering the rail.

19. The method for controlling the energy supply of a rail-mounted rail processing machine, according to claim 17, wherein waste heat of the fuel cell is supplied to a rail to be processed for pre-tempering the rail.

\* \* \* \* \*